March 23, 1965  K. REINER  3,175,031
SURFACE MOUNTED ELECTRICAL CONDUIT AND THE LIKE
Filed April 11, 1962  4 Sheets-Sheet 1
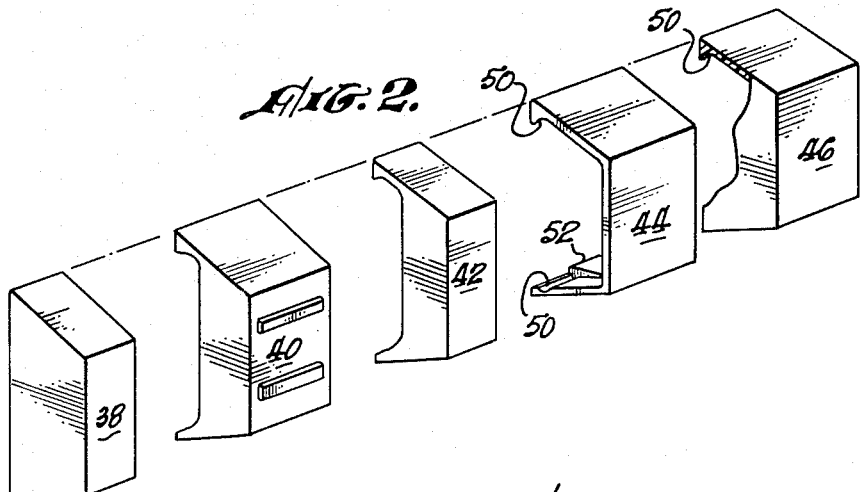
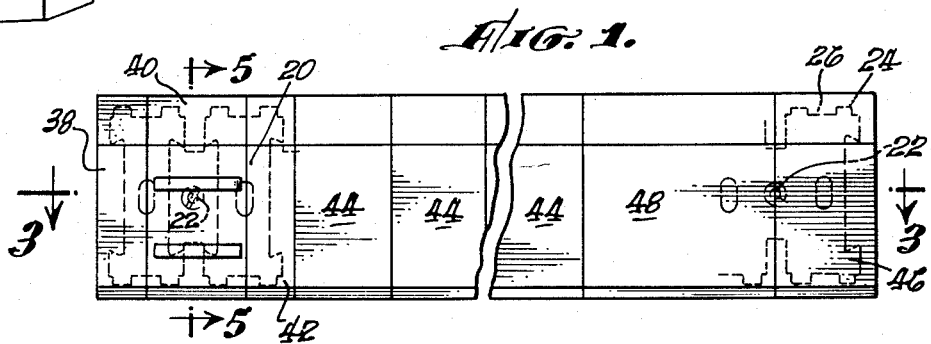
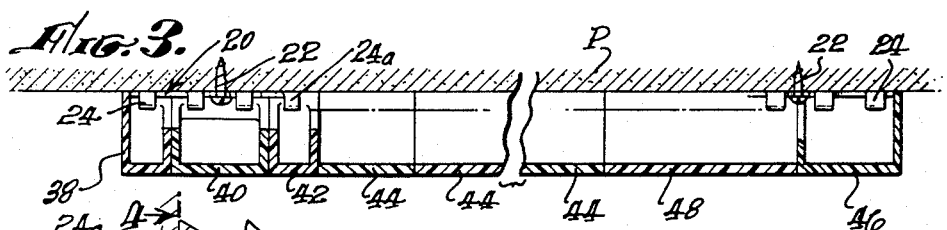
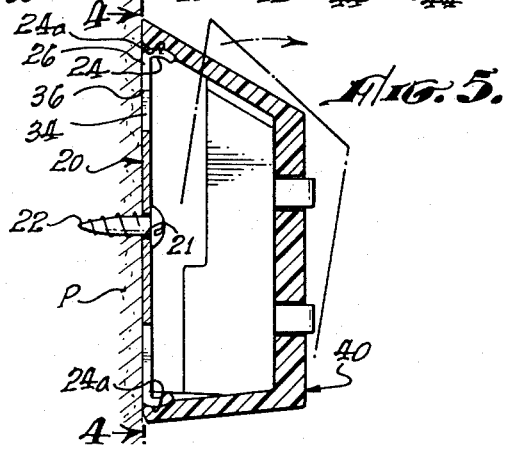
KENNETH REINER,
INVENTOR.
BY
ATTORNEY.

March 23, 1965 K. REINER 3,175,031
SURFACE MOUNTED ELECTRICAL CONDUIT AND THE LIKE
Filed April 11, 1962 4 Sheets-Sheet 2
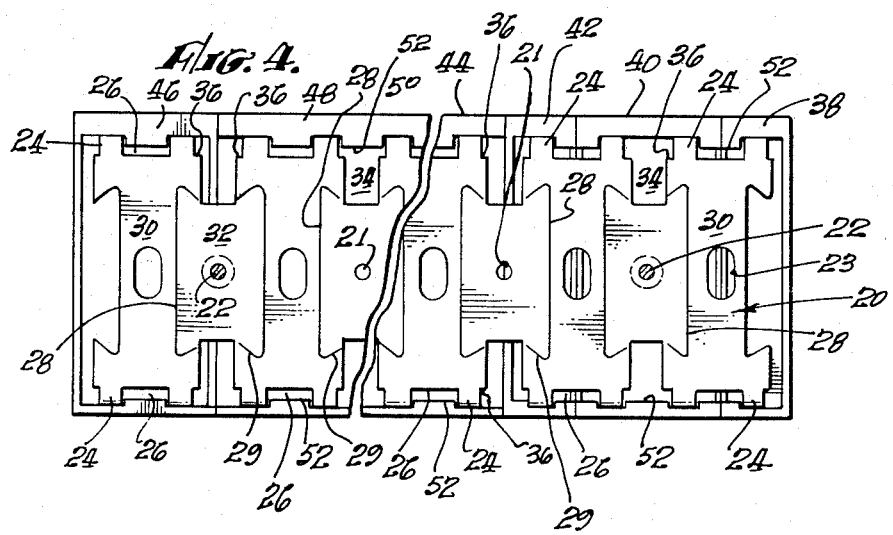
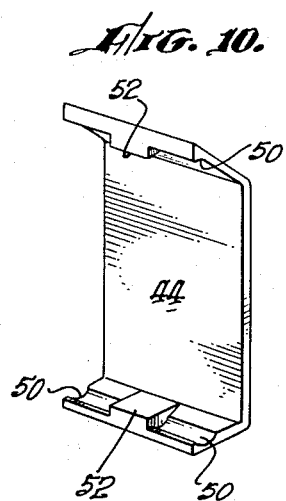
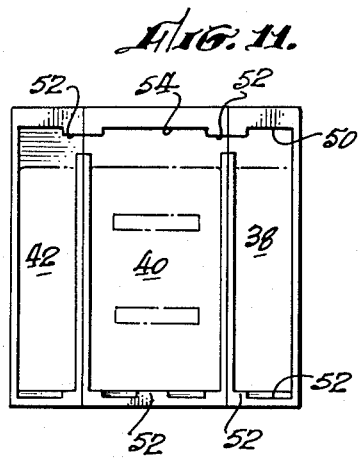
KENNETH REINER,
INVENTOR.
BY
ATTORNEY.

March 23, 1965  K. REINER  3,175,031
SURFACE MOUNTED ELECTRICAL CONDUIT AND THE LIKE
Filed April 11, 1962  4 Sheets-Sheet 3
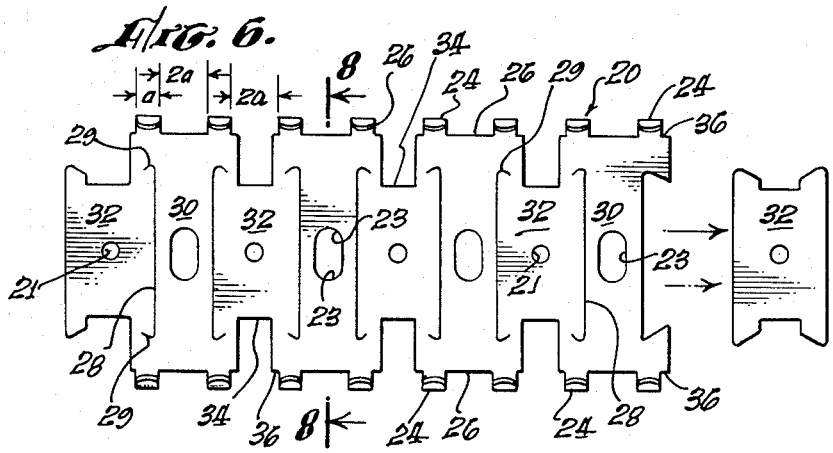
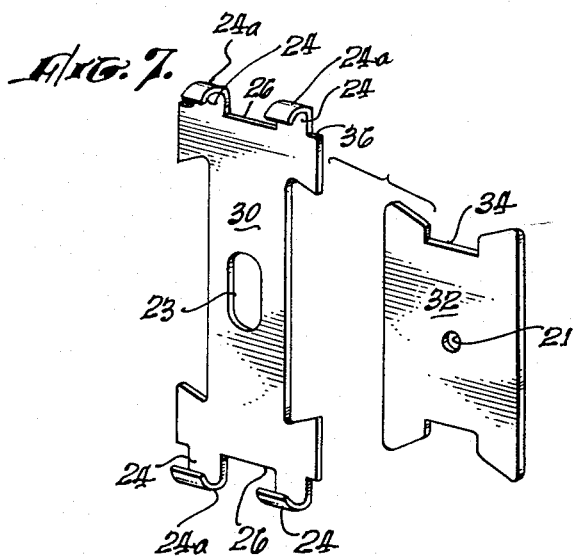
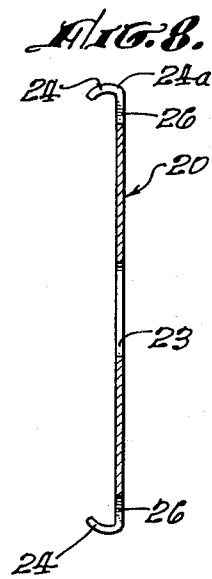
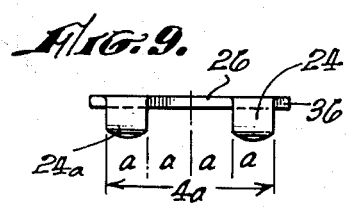
KENNETH REINER,
INVENTOR.
BY
ATTORNEY.

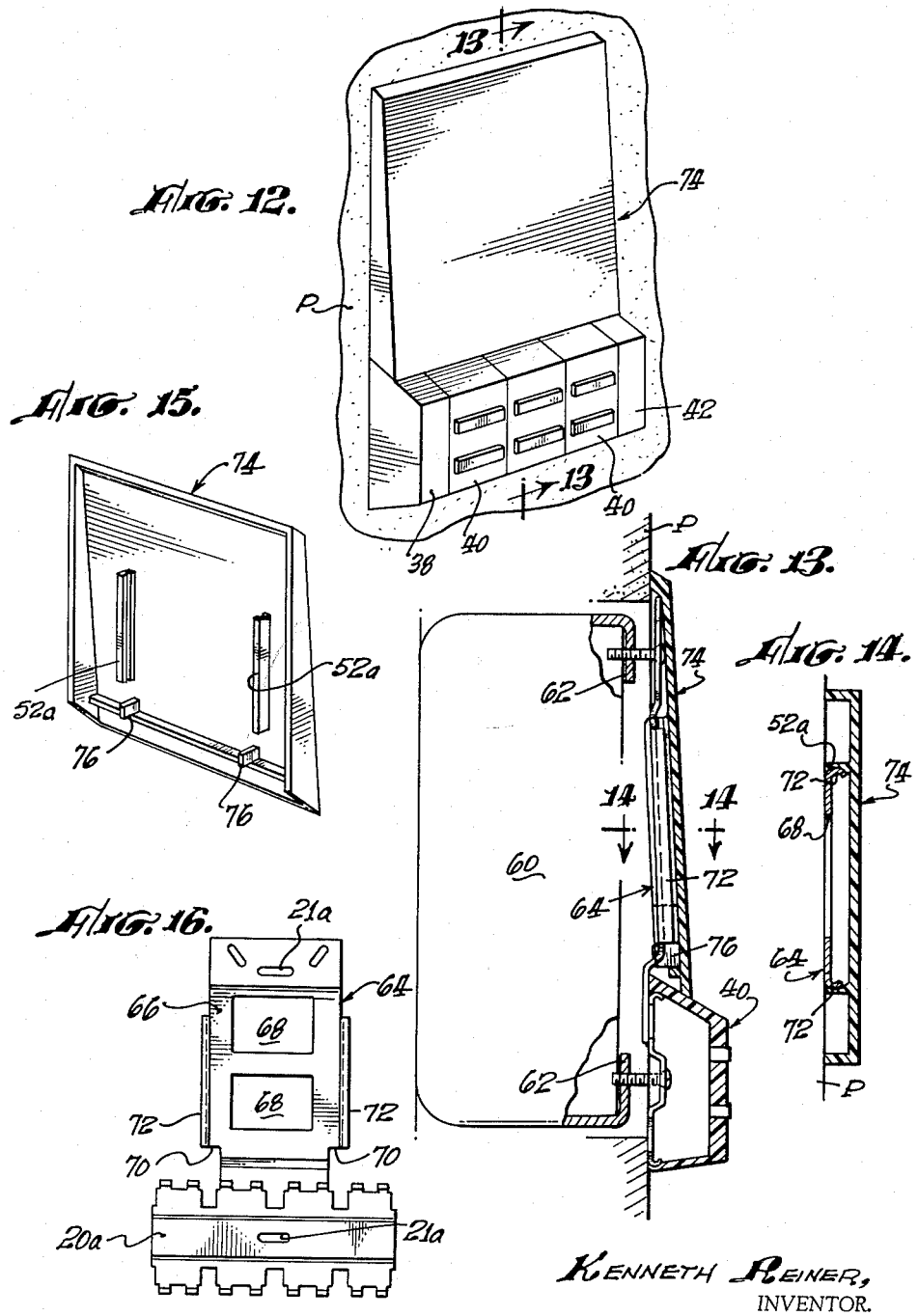

United States Patent Office 3,175,031
Patented Mar. 23, 1965

3,175,031
SURFACE MOUNTED ELECTRICAL
CONDUIT AND THE LIKE
Kenneth Reiner, 4811 Telegraph Road,
Los Angeles, Calif.
Filed Apr. 11, 1962, Ser. No. 186,741
14 Claims. (Cl. 174—48)

This invention relates to molding and to conduits and housings in molding form and more particularly to conduit for electrical wiring and to switch or electrical equipment housings. Still more specifically, the present invention relates to such conduits and housings arranged for mounting on the external surfaces of panels or walls and to the means for surface mounting such conduits and housings.

It has been the general practice of builders and electricians to place electrical conduit internally of the walls of structures, and such conduit is and has been relatively unsightly for this reason. Similarly, switch and outlet plug housings have been recessed into the walls, and such housings have evolved into unsightly metallic boxes which are covered by face plates to present a more pleasing appearance.

Thus, in new construction, wall-contained conduit and boxes are utilized as a matter of course. In old structures the addition of switches, outlets, and circuitry is still generally effected by installing such gear in the walls, at great difficulty and expense.

In recent years, some efforts have been made to provide externally mountable conduit in order to achieve greater flexibility of systems and ease of installation and alteration. However, such conduit has not come into popular use because of the difficulty of installation (in cutting it to size, etc.) and because a truly attractive external appearance has not been economically feasible with presently known structures. It is generally true that such installations are currently made only by skilled workmen and that they usually involve only multiple electrical outlet arrangements and have no practical means for including or supporting switches or other electrical appurtenances. Switch and outlet boxes are still generally set into holes in the walls.

The present invention provides externally mountable molding, usable as conduit or housing constructions and which can be easily installed by unskilled workmen using simple tools; which can be readily adapted to take forms of such aesthetic beauty as to warrant their use as decorative stripping; and which may have a modular construction such as to permit easy formation of conduit of any length without the use of any tools whatever. Moreover, the conduit and housing constructions of the present invention are readily adaptable to a wide variety of usages and are easily disassembled for change of components or for working on or altering a wiring system contained therein. The conduit of the present invention may include angular modules so that it can be positioned in and around corners and conform to door and window frames, all without requiring cutting tools of any kind. Thus, the conduit of the present invention is extremely versatile in that it may be surface mounted, and in that it may readily be removed and remounted upon alteration of either the wiring or the partitions or walls supporting the wiring.

As a related disadvantage of prior art practices, it is generally true that switch constructions are arranged to be retained within receptacles set into holes in the walls so that replacement or rewiring requires removal of the switch unit from the receptacle. The structures and techniques of the present invention now make it possible to place an adapter over existing wall receptacles and to surface mount switches and decorative face plates thereto, whereby the stated disadvantage of the prior art may be obviated in an arrangement of improved function and greater aesthetic beauty.

It is an object of the present invention to provide improved conduit adapted to be mounted on the surface of panels or walls.

A further object of the present invention is to provide improved electric conduit adapted to be face mounted on a surface and to include housings for switches or other electrical appurtenances.

Another object of the present invention is to provide electric conduit and/or switch housing constructions which may be easily installed by unskilled workmen using only the simplest of tools.

Still another object of the present invention is to provide conduit and/or housing constructions which are modular in nature and which may therefore be assembled to any desired length without the use of cutting tools.

Yet another object of the present invention is to provide electric conduit and/or housing constructions which are adapted for surface mounting and in which the conduit covers and housings are readily removable and replaceable without the use of tools to provide access to the wiring contained therein.

Still another object of the present invention is to provide electric conduit and/or housing constructions of such aesthetic beauty that they may be surface mounted and enhance the decorative scheme of the areas where utilized.

A further object of the present invention is to provide a conduit bracket or backing strip in a continuous length but having a design of score lines which permit it to be separated by hand to desired lengths.

A still further object of the present invention is to provide lengths of modular conduit cover segments separated by lines of weakness whereby the segments may be broken one from the other in single units or in a desired length.

Yet another object of the present invention is to provide conduit comprising backing strip or bracket means similarly spaced, whereby modular assembly of said articles is made possible.

Another object of the present invention is to provide means for surface mounting a cover and switch means over existing electrical wall receptacles whereby to enhance the appearance of electrical installations to secure the advantages of surface mounting.

These and other objects and the attendant advantages will be more fully understood from the following detailed description, taken in conjunction with the appended drawings, wherein like reference numerals have been applied to like parts throughout the various figures and wherein:

FIGURE 1 is a front elevation of surface mounted conduit and switch components, according to the present invention.

FIGURE 2 is a perspective view of unmounted conduit and switch components of the type shown in FIGURE 1.

FIGURE 3 is a sectional view taken along the line 3—3 of FIGURE 1.

FIGURE 4 is a view taken along the line 4—4 of FIGURE 3, being in fact a rear view of the structure shown in FIGURES 1 and 3.

FIGURE 5 is a sectional view taken along the line 5—5 of FIGURE 1.

FIGURE 6 is an elevational view of a form of mounting bracket strip according to the present invention, illustrating the breaking of the strip at a desired length.

FIGURE 7 is an enlarged perspective view showing one mounting module and one separator block of the mounting bracket strip of FIGURE 6.

FIGURE 8 is a cross-sectional view taken along the line 8—8 of FIGURE 6.

FIGURE 9 is a top view of the mounting module shown in FIGURE 7.

FIGURE 10 is a perspective view taken from the rear of one of the types of module of conduit shown in FIGURES 1 to 4.

FIGURE 11 is a rear elevation of a group of modular pieces comprising a switch housing and a pair of end pieces.

FIGURE 12 is a perspective view of a modified form of the present invention, wherein a face plate and switch assemblies or housings may be surface mounted over an electrical terminal box which is mounted in a wall.

FIGURE 13 is a sectional view taken along the line 13—13 of FIGURE 12.

FIGURE 14 is a sectional view taken along the line 14—14 of FIGURE 13.

FIGURE 15 is a perspective view, taken from the rear of a face plate element such as forms a part of the construction shown in FIGURES 12 to 14.

FIGURE 16 is a front elevation of the mounting strap element of the construction of FIGURES 12 to 14.

Attention is now directed to the drawnigs, wherein are depicted illustrative examples of structures according to the principles of the present invention. As has been indicated in the introductory remarks, the invention involves means for surface mounting a wide variety of types of elements on walls or panels, as for example, thin or thick conduit for conducting wire or the like, switch housings, face plates, etc. For the purposes of simplifying understanding of the ensuing remarks and of the appended claims, the word "molding" will be used herein, in a generic sense, to mean any element or device which is adapted to be surface mounted according to this invention, unless a more specific delineation is utilized.

Reference is now made to FIGURES 1 to 5 of the drawing, illustrating an exemplary construction according to the present invention and showing an assembly of a variety of types of molding elements upon a mounting bracket for surface mounting on a wall or panel.

In a broad sense, the present invention involves the combination of mounting bracket means adapted to be secured on the surface of a wall or panel, and a molding element or elements adapted to be secured on the mounting bracket in surface mounted relationship with said wall or panel. Thus, a mounting bracket 20 (see FIGURE 6) is provided with spaced openings 21 adapted to receive wood screws 22 or other suitable mounting means for mounting on the surface of a wall or panel and also has larger openings 23 adapted to accommodate lead wires. The mounting bracket is in the form of a narrow strap member and has attachment flanges 24 on its opposed longitudinal edges. Along each edge the flanges 24 are separated from one another by notches 26. Preferably the flanges 24 on the opposite edges are arranged in pairs, opposed to one another along lines perpendicular to the longitudinal axis of the mounting bracket, as shown. Each of the flanges 24 comprises a tongue extending outwardly from the longitudinal axis of the strap member in the plane of the strap member and then curving forwardly and inwardly to provide convex outer surfaces as best seen at 24a in FIGURES 5, 7, and 8.

It is advantageous, in some usages, as will presently be described, for the flanges 24 to be regularly spaced longitudinally from one another. In the examples shown in the drawings, the notches or spaces 26 between flanges 24 are each of a length "2a," equal to twice the linear extent "a" of the flanges (as illustrated in FIGURE 6). By this arrangement, alignment lugs of one appropriate size on molding pieces, which will be later described in detail, may be interfitted between any pair of flanges.

Mounting brackets as described hereinabove may be made of any length, as desired. They may also be made in the form of continuous lengths having score lines for permitting them to be readily broken to desired lengths by merely bending them at desired lines of breakage, as shown in FIGURES 1, and 3 to 9 of the drawings. For this purpose the strap member forming the mounting bracket is provided with score lines of such shape and location as to divide the strap member into alternate mounting modules 30 and spacer blocks 32 adapted to be separated from one another as in FIGURE 7 and in the right hand side of FIGURE 8.

In the example under discussion, every second notch 26 has a medial cut-out portion 34 extending inwardly toward the longitudinal axis of the strap member, each such cut-out portion 34 being aligned with a similar cut-out portion in the opposite edge of the strap member. Since cut-out portions 34 do not extend the entire linear distance between the adjacent flanges, shoulders 36 are provided, as shown, on a line with the notches 24 which do not have cut-out portions. Score lines 28 extend perpendicularly across the longitudinal axis of the strap member to either side of each of the cut-out portions 34, and each such score line has a short extension 29 extending generally longitudinally toward the next adjacent cut-out portion 34, it being notable, in the illustrated example, that the score line portions 29 extend entirely to the cut-out portion on the rear side of the strap member (see FIGURE 4) but do not extend the entire distance on the front side of the strap member (see FIGURE 6), whereby greater resistance to accidental breakage is achieved.

Reference is now made to the molding elements which form a part of the present invention and which are structurally formed for cooperation with the mounting bracket means previously described. It should be understood that such molding may include switch housing sections, conduit sections, and end pieces of any desired length or depth, it being essential to the practice of this invention only that they be of proportions and construction to cooperate with the mounting bracket 20, as will be hereinafter described. Attention is directed to FIGURE 2, wherein are shown in perspective some varieties of molding, as for example a left housing end piece 38, a switch housing section 40, a right housing end piece 42, a single conduit section 44, and an end conduit section 46. It is also pointed out that the conduit sections may be made of any desired multiple of a standard length, as for example, the double length conduit section 48 shown in FIGURES 1 and 3.

Each of the molding pieces comprises a front wall and rearwardly extending top and bottom walls, the rearward extent of said top and bottom walls being in a single plane whereby to be capable of resting flatly against a planar wall or panel surface. Internally of the top and bottom walls, the molding is provided with an arrangement of attachment surfaces 50 and lugs 52 for cooperation with the flanges 24 and notches 26 of the mounting bracket 20. The lugs 52 are each of linear extent to fit closely within the notches 26 of the mounting bracket 20 or of a size to fit substantially half of a notch 26 to one side of the center line thereof. The lugs 52 comprise abutments extending inwardly toward the longitudinal axis of the molding and have rearwardly directed walls which are coplanar with the rear surfaces of the top and bottom walls of the molding, whereby the lugs 52 may enter into the notches 26, and the lugs as well as the said rear surfaces may abut against the surface of the wall or panel to which the mounting strip is attached. For this purpose, successive lugs 52 on the molding are spaced longitudinally of the molding in such a manner as to engage at least some of the notches in the mounting bracket but without interfering with the flanges 24 of the bracket.

The attachment surfaces 50 are positioned forwardly of the rearward edges of the top and bottom walls of the molding and such surfaces comprise opposed inwardly directed concave surfaces adapted to cooperate with the convex attachment flanges 24 of the mounting bracket 20. For this purpose the distance between opposed attachment surfaces 50 on the molding is slightly less than the maximum distance between opposed flanges 24 on the mounting bracket 20, whereby the molding pieces may be expanded slightly to allow concave surfaces 50 to ride over the convex flanges 24 and to snap into engagement therewith, as illustrated in FIGURE 5 so that resistance to forward separation is substantial.

Obviously, molding as described may be made of unitary construction of any desired length and of any desired depth and external configuration. The present invention also lends itself to the provision of very versatile modular arrangements, since the regular spacing of movement inhibiting notches 26 and attachment flanges 24 on the mounting bracket permits the provision of modules or short lengths of molding pieces adapted to be secured in abutting side-by-side relationship on the mounting bracket. Therefore, the positions of the lugs 52 and attachment surfaces 50 on each module or length of molding are so arranged relative to the side edges of the module or piece that the said edges are closely abutted to one another in the assembled relationship of the modules or pieces of the mounting bracket. As has been previously indicated, a good deal of variation is permissible in applications of the present invention to specific installations and to specific types of modules. Attention is directed to FIGURES 1, 2, 3, 4, 10, and 11, wherein are illustrated various types of modules and various arrangements of placement lugs and attachment surfaces thereon, and which are each attached to cooperate with one another and with the mounting bracket to provide a unitary appearance when assembled side by side with one another.

In order to provide the above-mentioned cooperative abutting relationship of individual modules with one another, it is necessary that there be a definite relationship between the linear extent of each module and the position of the spacing lugs 52 thereon, although different satisfactory relationships are possible in some cases.

In the illustrated system, the aforementioned abutting side-by-side relationship is assured for any combination of types or lengths of modules by the placement of lugs 52 on each module in such a position (or positions) relative to the edges of the module that each of said edges coincides with the transverse center-line of a pair of notches 26. With such an arrangement, the length of any module must be a multiple of the distance between the center-lines of adjacent notches 26 in the mounting bracket 20, and each module must be provided with at least one pair of opposed positioning lugs 52 which are placed to position the edges of the module at the center-lines of notches 26. Thus end pieces 38 and 42 are of the minimum permissible linear extent (for the system under discussion), which is the distance between the center-lines of next adjacent pairs of notches 26, it being notable that such short end sections are provided with placement lugs 52 adjacent one edge thereof, and of an extent to fit within one-half of a notch 26. If it is remembered that end pieces such as the modules 38 and 42 are always abutted against another piece at the center line of a pair of notches, it will be obvious that the half-length lugs 52 thereof will be tightly engaged against longitudinal shifting, within notches 26.

Another example (best shown in FIGURE 10) is a standard size module 44, which is also illustrated in FIGURES 1 to 4 and which is of a linear extent equal to twice the distance between the center-lines of next adjacent notches 26. In the examples given, the arrangements and spacing of the lugs 52 on the modules is therefore such that any possible mixture of types of modules is possible in an arrangement wherein the edges of all of the modules are abutting to provide a closed and continuous conduit. It should be noted that the switch modules 40 are preferably of a longitudinal extent to be integrated into the system. In the illustrated example, switch modules 40 are of the same length as standard conduit sections 44 and are provided with attachment surfaces 50 and attachment lugs 52 in the manner previously described.

Attention is now directed to FIGURES 12 to 16, illustrating the adaptation of the principles of the present invention to constructions wherein outlet boxes are utilized. Where an outlet box embedded in a wall for the purpose of housing electrical wire ends, switches, outlets or other electrical components, such a box may be adapted to support closure means and switches or conduit. Thus, an outlet box 60 (shown fragmentarily in FIGURE 13) generally includes attachment tangs 62 having attachment screw openings therein. For purpose of attaching switch or conduit segments and a cover plate across the open front of terminal box 60 there is provided an adapter or mounting strap, generally designated by the reference numeral 64.

Mounting straps 64 comprises an upper portion 66 to which a section 20a of mounting bracket (as previously described) is fixedly attached by any suitable manner, as by spot welding (not shown). The dimensions are such that attachment screw openings 21a may be spaced apart a distance such as to coincide with the openings in the tangs 62 of terminal box 60 whereby screws may be utilized to secure the mounting strap 64 to the terminal box, as shown in FIGURE 13.

The upper portion 66 of mounting strap 64 may be provided with openings as at 68 to accommodate electrical components if desired. The side edges of portion 66 are provided with laterally extending wings 68 which are of length to provide lower shoulders 70, a distance above the mountings strap portion 20a. The edges of wings 68 are bent forwardly and inwardly (see FIGURE 14) to provide outwardly convex attachment flange surfaces, as at 72.

Outlet box face plate or closure means (generally designated by reference numeral 74) are provided to cooperate with and be attached to the mounting strap 64 in covering the open face of outlet box 60. The rear surface of plate 74 includes parallel integral attachment lug strips 52a which are inwardly concave and which are spaced apart such a distance as to snap over the outwardly convex attachment flange surfaces 72 of portion 66 of the mounting strap 64. The rear surface of plate 74 also has positioning lugs 76 arranged to engage the positioning shoulders 70 on the mounting strap to definitely fix the assembled position of the plate 74.

In use, the mounting strap 64 is attached to a terminal or outlet box 60 as previously described. An assembly of switch housings 40 and end pieces 38 and 42 (or of other modules of equivalent desirable length) are attached to the mounting bracket portion 20a in the manner fully discussed in connection with the description of FIGURES 1 to 11 hereinabove. Face plate 74 is then positioned by engaging the lugs 76 with stop shoulders 70 on the mounting bracket and by snapping the strips 52a over the attachment surfaces 72 of the bracket. As shown in the drawings, the external configurations may be designed to give a unified pleasant appearance and to serve as a complete closure for the terminal box opening, the closure being neat and flush with the wall.

From the above it may be seen that the present invention provides improved means for the surface mounting of conduit, electrical components, face plate members and the like, as well as various combinations thereof. It should also be evident that said improved means are such as to provide extreme flexibility in usage and improved aesthetic and decorative effects and are adapted to be installed by unskilled workmen, using only the simplest of tools.

While the foregoing description and the appended drawings specifically describe and illustrate two adaptations of devices according to the present invention, it will be obvious that many variations of proportion, materials and dimensions are possible without departing from the spirit and essential nature of the invention and that other variations are similarly possible within the scope of the present disclosure. For example, molding strips may be provided in lengthy strips having score lines between modules whereby to be broken to size without tools. Conversely both molding parts and brackets might be provided in predetermined lengths and arrangements without score lines, if desired.

It is to be understood, therefore, that the present invention is not to be limited by the specific illustrative examples but rather by the scope of the appended claims.

What is claimed is:

1. A mounting bracket adapted to support molding on a surface, said bracket comprising a strap member adapted to be secured to a supporting surface with its rearwardly disposed face abutting said surface, the opposed edges of said strap member having a plurality of pairs of opposed notches spaced from one another by a plurality of pairs of opposed attachment flanges, said notches being similar to one another and being in the plane of the strap member and extending inwardly from said edges toward the longitudinal axis of the strap member, said flanges being similar to one another and each comprising a tongue extending outwardly from the longitudinal axis of the strap member and then extending forwardly thereof, said tongues being curved and having convex outer surfaces, the linear extent of each of said notches being substantially twice the linear extent of each of said flanges.

2. A mounting bracket according to claim 1, wherein the strap member is scored transversely of the longitudinal axis, at regular intervals, along lines crossing the centers of the longitudinal extent of opposed pairs of notches, whereby the strap member may be broken manually to desired lengths at points between adjacent flanges.

3. A mounting bracket adapted to support molding on a surface, said bracket comprising a strap member adapted to be secured to a supporting surface with its rearwardly disposed face abutting said surface, the opposed edges of said strap member having opposed notches and opposed attachment flanges, said notches being similar to one another and being in the plane of the strap member and extending inwardly from said edges toward the longitudinal axis of the strap member, said flanges being similar to one another and each comprising a tongue extending outwardly from the longitudinal axis of the strap member in the plane of the strap member and then extending forwardly thereof, said tongues being curved and having convex outer surfaces, each of said notches having a linear extent of substantially twice the linear extent of each of said flanges, said strap member being comprised of spaced mounting modules separated from one another by spacer blocks, the mounting modules and the spacer blocks being integrally connected to one another in end-to-end relation to form the strap member, the lines of connection of said spacer blocks with said mounting modules being scored to weaken the strap member along such lines whereby the strap member may be broken to any desired length, at either side of any spacer block.

4. A mounting bracket according to claim 3, further characterized in that each mounting module comprises a length of said strap member having at least two pairs of opposed flanges thereon, and wherein the notches next adjacent the ends of said length of strap member have medial cut-out portions extending inwardly towards the longitudinal axis of the strap member a greater distance than the remainder of said notches, said scored lines of connection between the spacer blocks and mounting modules having configurations wherein they extend perpendicularly of the longitudinal axis of the strap member along lines within the longitudinal outlines of the flanges and then extend longitudinally to the next adjacent cut-out portion, whereby the spacer blocks may be broken off inboard of the longitudinal extent of any mounting module whereby an end edge of molding attached to the strap may abut the surface to which the strap member is attached.

5. A composite mounting bracket adapted to be secured in a terminal box of the type which is generally secured internally in a hole in a wall and which has opposed lugs directed toward one another internally for attachment to an electrical instrumentality to support such an instrumentality substantially in the plane of the outer surface of said wall; said bracket comprising a supporting frame of generally rectangular configuration, a strap member attached to one end of said frame with the longitudinal axis of said strap member perpendicular to that of said frame, the frame and strap member having aligned openings spaced to receive screws for securement in the lugs of a terminal box, the opposed edges of said strap member having alternate notches and attachment flanges for engaging and supporting a length of molding, the edges of said frame which are perpendicular to the longitudinal axis of said strap member having attachment flanges for engaging and supporting a face plate, whereby the composite mounting bracket is adapted to be secured to the lugs of a terminal box, and whereby molding may be secured to said strap member and whereby a face plate may be secured to said supporting frame, in surface mounted relationship to the outer surface of the wall surrounding the hole in which said terminal box is supported.

6. In combination, a mounting bracket and molding mounted on said bracket; said bracket comprising a strap member adapted to be secured to a supporting surface with its rearwardly disposed face abutting said surface, the opposed edges of said strap member having alternate notches and attachment flanges; said molding comprising a main body having opposed rearwardly extending upper and lower walls, the rearward edges of said walls being in a plane, said walls having spaced attachment means forward of said edges for engagement with said attachment flanges for supporting said molding on said strap member, said edges having inwardly directed lug means between said attachment means, said lug means being engaged in said notches, thereby positioning the molding on said strap member and inhibiting relative lateral shifting of the molding and the strap member.

7. In combination, a mounting bracket and molding mounted on said bracket; said bracket comprising a strap member adapted to be secured to a supporting surface with its rearwardly disposed face abutting said surface, the opposed edges of said strap member having alternate notches and attachment flanges, said notches being in the plane of the strap member and extending inwardly from said edges toward the longitudinal axis of the strap member, said flanges comprising tongues extending outwardly from the longitudinal axis of the strap member in the plane of the strap member and then extending forwardly thereof, said tongues being curved and having convex outer surfaces; said molding comprising a main body having opposed rearwardly extending upper and lower walls, the rearward edges of said walls being in a plane, said walls each having spaced attachment means on the inner surfaces thereof forward of said edges, said attachment means comprising inwardly directed concave surfaces engaging and gripping the convex outer surfaces of the attachment flanges of the strap member, inwardly directed lug means between said attachment means, said lug means having rearward surfaces in the plane of the rearward edges of said walls, whereby said lugs are engaged in the notches of the strap member and the rearward edges of said walls and the lugs thereon abut the surface of a wall on which the strap member is mounted.

8. The combination of claim 7, wherein the attachment flanges on said strap member are regularly spaced from one another along the edges of the strap member and wherein each of said flanges is aligned transversely of the longitudinal axis of the strap member with an opposed flange on the opposite edge of the strap member to form opposed pairs of notches and attachment flanges, and wherein the lugs on the upper and lower walls of said molding are spaced to engage in at least some of the notches of said strap member.

9. The combination of claim 8 wherein said molding is comprised of a plurality of sections assembled end-to-end on said mounting bracket to form a unitary construction, and wherein the attachment lugs on said sections include end lugs at the linear ends of both the upper and lower walls of each of the sections, said end lugs each being slightly less than one-half the linear extent of each of the notches in said strap member, whereby adjacent sections are held in abutting side-by-side relationship on said mounting bracket by the snug engagement of adjacent end lugs in single notches on said strap member.

10. The combination of claim 9, wherein the linear extent of each of said notches in said strap member is substantially twice the linear extent of each of the attachment flanges on said strap member, whereby the abutting ends of adjacent sections of the molding are positioned between any adjacent pairs of opposed flanges on the strap member.

11. The combination of claim 10, wherein said strap member is comprised of spaced mounting modules separated from one another by spacer blocks, the mounting modules and the spacer blocks being integrally connected to one another in end-to-end relation to form the strap member, the lines of connection of said spacer blocks with said mounting modules being scored to weaken the strap along such lines whereby the strap member may be broken to any desired length, at either side of any spacer block.

12. The combination of claim 11, wherein each mounting module comprises a length of said strap member having at least two pairs of opposed flanges thereon, the notches next adjacent the ends of said length of strap member having medial cut-out portions extending inwardly towards the longitudinal axis of the strap member a greater distance than the remainder of said notches, the scored lines of connection between the spacer blocks and mounting modules having configurations wherein they extend perpendicularly of the longitudinal axis of the strap member along lines within the longitudinal outlines of the flanges and then extend longitudinally to the next adjacent cut-out portion, whereby the spacer blocks may be broken off inboard of the longitudinal extent of any mounting module and the end edge of molding attached to the strap member extends beyond the end extremity of the strap member.

13. The combination of claim 12, further characterized in that at least one end section of said molding has a side wall which has a rearward edge in the plane of the rearward edges of the upper and lower walls thereof, whereby said rearward edge of said side wall abuts the surface of the wall to which the mounting bracket is attached to serve as an end closure for the molding.

14. In combination, a composite mounting bracket adapted to be secured in a terminal box of the type which is generally secured internally in a hole in a wall and which has opposed lugs directed toward one another internally for attachment to an electrical instrumentality to support such an instrumentality substantially in the plane of the outer surface of said wall; said bracket comprising a supporting frame of generally rectangular configuration, a strap member attached to one end of said frame with the longitudinal axis of said strap member perpendicular to that of said frame, the frame and strap member having aligned openings spaced to receive screws for securement in the lugs of a terminal box, the opposed edges of said strap member having alternate notches and attachment flanges, the edges of said frame which are perpendicular to the longitudinal axis of said strap member being curved to form attachment flanges, molding attached to said mounting bracket, said molding comprising a main body having opposed rearwardly extending upper and lower walls, the rearward edges of said walls being in a plane, said walls having spaced attachment means forward of said edges for engagement with said attachment flanges for supporting said molding on said strap member, said edges having inwardly directed lug means between said attachment means, said lug means being engaged in said notches, thereby positioning the molding on said strap member and inhibiting relative lateral shifting of the molding and the strap member; and a face plate secured to said supporting frame, said face plate having attachment means on the rear surface thereof, said attachment means comprising elongated ribs spaced apart substantially the same distance as are the edges of the attachment flanges on said frame, said ribs having longitudinal grooves engaging the attachment flanges on said frame and said frame being of lateral extent to completely cover the hole in the wall, said face plate having edges extending rearwardly to a plane such that they abut the surface of the wall around said hole.

References Cited by the Examiner
UNITED STATES PATENTS

| | | | |
|---|---|---|---|
| 1,108,446 | 8/14 | Johnson | 20—74 X |
| 1,173,398 | 2/16 | Van Orden | 50—145 X |
| 1,920,811 | 8/33 | Schwabacher | 174—53 |
| 2,478,006 | 8/49 | Paden | 339—21 |
| 2,685,721 | 8/54 | Eves | 24—73 |
| 2,743,423 | 4/56 | Parks | 339—21 |

OTHER REFERENCES
Allen-Bradley Advertisement Electro-Technology, page 10, Oct. 10, 1961.

JOHN F. BURNS, *Primary Examiner.*

JOHN P. WILDMAN, *Examiner.*